United States Patent
Gui et al.

(10) Patent No.: US 12,533,214 B2
(45) Date of Patent: Jan. 27, 2026

(54) PRODUCTION METHOD AND SYSTEM OF DENTAL INSTRUMENT, APPARATUS, AND MEDIUM

(71) Applicant: GUANGZHOU HEYGEARS IMC. INC, Guangzhou (CN)

(72) Inventors: Peiyan Gui, Guangzhou (CN); Yangshuai Fan, Guangzhou (CN); Xin Wan, Guangzhou (CN); Heyuan Huang, Guangzhou (CN); Wei Feng, Guangzhou (CN); Qin Li, Guangzhou (CN); Ming Li, Guangzhou (CN); Shaoxiang Yuan, Guangzhou (CN); Yuqing Ye, Guangzhou (CN); Yong Wang, Guangzhou (CN); Haoshun Hong, Guangzhou (CN)

(73) Assignee: GUANGZHOU HEYGEARS IMC. INC, Guangzhou (CN)

( * ) Notice: Subject to any disclaimer, the term of this patent is extended or adjusted under 35 U.S.C. 154(b) by 376 days.

(21) Appl. No.: 18/149,136

(22) Filed: Jan. 2, 2023

(65) Prior Publication Data
US 2023/0141168 A1  May 11, 2023

Related U.S. Application Data

(63) Continuation-in-part of application No. PCT/CN2020/134570, filed on Dec. 8, 2020.

(51) Int. Cl.
*A61C 7/08* (2006.01)
*A61C 7/00* (2006.01)
*A61C 9/00* (2006.01)

(52) U.S. Cl.
CPC ............. *A61C 7/002* (2013.01); *A61C 7/08* (2013.01); *A61C 9/0006* (2013.01); *A61C 9/0053* (2013.01)

(58) Field of Classification Search
None
See application file for complete search history.

(56) References Cited

U.S. PATENT DOCUMENTS

| | | |
|---|---|---|
| 2005/0019732 A1 | 1/2005 | Kaufmann et al. |
| 2007/0030376 A1 | 2/2007 | Kosaka |

(Continued)

FOREIGN PATENT DOCUMENTS

| | | |
|---|---|---|
| CN | 1921564 A | 2/2007 |
| CN | 101115137 A | 1/2008 |

(Continued)

OTHER PUBLICATIONS

International Search Report for PCT Appl. No. PCT/CN2020/134570 dated Mar. 26, 2021.

(Continued)

*Primary Examiner* — Paul B Yanchus, III
(74) *Attorney, Agent, or Firm* — Scully, Scott, Murphy & Presser, P.C.

(57) ABSTRACT

A production system and method of dental instrument. After constructing a digital three-dimensional (3D) model of patient's teeth, pre-processing operations, comprising identifying gum lines on the digital 3D model and adding identifier information to the digital 3D model, are performed on the digital 3D model, and 3D printing is performed on the basis of the identifier information of the digital 3D model to obtain a first dental mold; and a film press processing is performed according to the first dental mold to obtain a second dental mold, identifier identification is performed on the second dental mold, and the identifier information is marked on the second dental mold according to the identification result to obtain a dental appliance. The production system and method are applied to the technical field of dental appliance production.

20 Claims, 8 Drawing Sheets

(56) References Cited

U.S. PATENT DOCUMENTS

| | | | |
|---|---|---|---|
| 2015/0359609 A1 | 12/2015 | Khan | |
| 2016/0070821 A1* | 3/2016 | Somasundaram | A61C 7/00 703/1 |
| 2019/0192258 A1 | 6/2019 | Kang et al. | |
| 2020/0246119 A1* | 8/2020 | Long | B29C 64/20 |
| 2022/0258420 A1* | 8/2022 | Märklin | B33Y 30/00 |

FOREIGN PATENT DOCUMENTS

| | | |
|---|---|---|
| CN | 103827918 A | 5/2014 |
| CN | 104224331 A | 12/2014 |
| CN | 104739527 A | 7/2015 |
| CN | 205844212 U | 12/2016 |
| CN | 107253485 A | 10/2017 |
| CN | 107310268 A | 11/2017 |
| CN | 108021917 A | 5/2018 |
| CN | 108320325 A | 7/2018 |
| CN | 109188550 A | 1/2019 |
| CN | 109646127 A | 4/2019 |
| CN | 209273445 U | 8/2019 |
| CN | 110394555 A | 11/2019 |
| CN | 110522526 A | 12/2019 |
| CN | 110717686 A | 1/2020 |
| CN | 111823726 A | 10/2020 |
| CN | 112008234 A | 12/2020 |
| CN | 112991294 A | 6/2021 |
| JP | 2013-180388 A | 9/2013 |

OTHER PUBLICATIONS

CNPTO, "Notice of Grant", issued in connection with Chinese Patent Application 202010633112.6, dated Jun. 29, 2022, 3 pages (2 pages of English Translation and 1 page of official copy).

CNPTO, "First Office Action", issued in connection with Chinese Patent Application 202010633112.6, dated Apr. 18, 2022, 14 pages (8 pages of English Translation and 6 pages of official copy).

CNPTO, "Rejection Decision", issued in connection with Chinese Patent Application 202011111142.7, dated Mar. 3, 2022, 13 pages (8 pages of English Translation and 5 pages of official copy).

CNPTO, "Notice of Grant", issued in connection with Chinese Patent Application 202011111142.7, dated Aug. 1, 2022, 3 pages (2 pages of English Translation and 1 page of official copy).

CNPTO, "First Office Action", issued in connection with Chinese Patent Application 202011111142.7, dated Jun. 3, 2021, 18 pages (10 pages of English Translation and 8 page of official copy).

CNPTO, "Second Office Action", issued in connection with Chinese Patent Application 202011111142.7, dated Nov. 15, 2021, 24 pages (15 pages of English Translation and 9 page of official copy).

CNPTO, "Third Office Action", issued in connection with Chinese Patent Application 202011111142.7, dated Jul. 4, 2022, 9 pages (4 pages of English Translation and 5 page of official copy).

* cited by examiner

PRODUCTION METHOD AND SYSTEM OF DENTAL INSTRUMENT, APPARATUS, AND MEDIUM

CROSS-REFERENCE TO RELATED APPLICATION

This application is a continuation-in-part and claims benefit of International Application No. PCT/CN2020/134570 filed on Dec. 8, 2020, which claims priority to Chinese Patent Application No. 202010633112.6 filed on Jul. 2, 2020 and Chinese Patent Application No. 202011111142.7 filed on Oct. 16, 2020, the contents of which are incorporated herein by reference in its entirety for reference.

TECHNICAL FIELD

The present disclosure relates to the technical field of dental instrument production, in particular to production system and method of dental instrument.

BACKGROUND ART

The dentognathic deformity always has relatively high incidence, not only affecting oral health and physical health, but also having considerable impact on the patients' mental health. With the development of society and the improvement of esthetics, more and more patients focus on dental hygiene, participate in health care, and seek to dentognathic deformity correction.

The shell-shaped dental appliance is formed by attaching a layer of thin elastic material to a dental jaw model of an orthodontic patient and performing hot pressing. During the orthodontic correction, the shell-shaped dental appliance is worn on the teeth of the orthodontic patient, and a control force can be applied at a specific position so as to gradually move the teeth to a desired morphology.

In the related art, when manufacturing the shell-shaped dental appliance, a professional dental technician needs to observe the patients' gums, and then manually design a cutting curve of gum lines. Such a manual design manner is prone to human errors, and leads to a large design error of the appliance and a low yield; meanwhile, the manual design manner has a low efficiency, and a professional technician with abundant experience is required to accomplish the work. On the other hand, the dental appliance manufactured in the prior art cannot reflect diagnosis and treatment information of a user, which is not conducive for medical staff to provide the user with follow-up services such as maintenance or diagnosis and treatment according to the dental appliance used by the user.

SUMMARY

With regard to at least one technical problem in the above, an objective of the present disclosure lies in providing a production system and method of dental instrument. On the one hand, an embodiment of the present disclosure includes a production system of dental instrument, including a control center, a pre-processing module, a 3D molding module, a film pressing module, a laser marking module, and an acquisition terminal;
the pre-processing module is configured to construct a digital three-dimensional model of teeth of a target patient, and perform a pre-processing operation on the digital three-dimensional model, the pre-processing operation including identifying gum lines on the digital three-dimensional model and adding identifier information to the digital three-dimensional model;
the 3D molding module is configured to perform 3D printing according to the digital three-dimensional model to obtain a first tooth mold, the first tooth mold carries the identifier information;
the film pressing module is configured to perform a film pressing process according to the first tooth mold to obtain a second tooth mold, the second tooth mold includes the first tooth mold and a shell-shaped membrane cladding the first tooth mold;
the acquisition terminal is configured to acquire an image of the second tooth mold, the control center includes a database preset with a plurality of marking instructions and an image identification module, the image identification module is configured to, after acquiring the identifier information in the second tooth mold, match a marking instruction corresponding to the identifier information from the database preset with a plurality of marking instructions, and send the marking instruction to the laser marking module; and
the laser marking module is configured to perform a marking operation according to the marking instruction to obtain a dental appliance.

Further, the performing a pre-processing operation on the digital three-dimensional model includes:
automatically placing the digital three-dimensional model to a designated position;
identifying gum lines on the digital three-dimensional model;
performing acute-angle removal and offset processes on the identified gum lines to obtain a cutting curve, and converting the cutting curve into an NC file;
generating unique identifier information about a corresponding digital three-dimensional model; and
placing the identifier information in a corresponding area of the digital three-dimensional model.

Further, the performing a pre-processing operation on the digital three-dimensional model further includes:
segmenting the digital three-dimensional model to obtain several slice layers;
hollowing out the digital three-dimensional model;
performing a bottom plate grid filling processing on the digital three-dimensional model; and
providing a positioning portion at the bottom of the digital three-dimensional model.

Further, the automatically placing the digital three-dimensional model to a designated position includes:
acquiring the digital three-dimensional model;
detecting a largest plane of the digital three-dimensional model;
calculating a first rotation angle and a first rotation axis of the digital three-dimensional model with a cross product operation;
spatially rotating the digital three-dimensional model according to the first rotation angle and the first rotation axis to acquire a tooth model;
projecting the tooth model into a tooth contour curve;
calculating a direction vector of the tooth model before and after the spatial rotation;
according to the direction vector, calculating a second rotation angle and a second rotation axis of the digital three-dimensional model through the cross product operation; and
performing plane rotation on the digital three-dimensional model according to the second rotation angle and the second rotation axis.

Further, the identifying gum lines on the digital three-dimensional model includes:
acquiring initial feature points of the digital three-dimensional model;
denoising the initial feature points to obtain optimal feature points;
determining a contour line by traversing historical data according to shape and contour of the digital three-dimensional model;
fitting the optimal feature points and the contour line to form an initial fitting line;
acquiring a contour shape of the digital three-dimensional model by adopting a principal component analysis method according to the initial fitting line; and
acquiring a smooth gum line according to the contour shape.

Further, the production system further includes a workbench, the workbench is configured to place the second tooth mold; the acquisition terminal is provided with an image acquisition element, a first photoelectric sensor, and a second photoelectric sensor, a first end of the image acquisition element is connected to the first photoelectric sensor, and a second end of the image acquisition element is connected to the second photoelectric sensor, the image acquisition element is configured to acquire identifier information about the first tooth mold, the first photoelectric sensor is configured to detect a state of the second tooth mold, and the second photoelectric sensor is configured to detect a state of other articles in the workpiece placement area of the workbench except the second tooth mold.

Further, the acquiring the identifier information in the second tooth mold includes:
acquiring picture information about the second tooth mold;
extracting a target picture of a region where the identifier information is located from picture information about the second tooth mold; and
identifying the identifier information in the target picture, and acquiring an optimal identification result according to a cross-validation method.

Further, the identifying the identifier information in the target picture, and acquiring an optimal identification result according to a cross-validation method includes:
performing a normalization pre-processing on the identifier information;
performing character identification on the identifier information having undergone the normalization pre-processing, and acquiring a prediction result of character unit and a set of degree of confidence; and
acquiring an optimal identification result by combining a character library and calibration bit according to the prediction result of character unit and the set of degree of confidence.

Further, the production system further includes a cutting machine, the database is further preset with a plurality of cutting instructions, the image identification module is further configured to, after acquiring the identifier information in the second tooth mold, match a cutting instruction corresponding to the identifier information from the database, and send the cutting instruction to the cutting machine; and
the cutting machine is configured to perform a cutting operation according to the cutting instruction.

Further, the identifier information is in the form of at least one of hollowed-out characters, raised characters, and groove characters, and the identifier information is set as a combination of numbers and letters.

In another aspect, an embodiment of the present disclosure includes a production method of dental instrument, including:
constructing a digital three-dimensional model of a target patient's teeth;
performing a pre-processing operation on the digital three-dimensional model, the pre-processing operation including identifying gum lines on the digital three-dimensional model and adding an identifier information to the digital three-dimensional model;
performing 3D printing according to the digital three-dimensional model, to obtain a first tooth mold, the first tooth mold carrying the identifier information;
performing a film pressing process according to the first tooth mold to obtain a second tooth mold, the second tooth mold including the first tooth mold and a shell-shaped membrane cladding the first tooth mold;
acquiring an image of the second tooth mold;
matching a marking instruction corresponding to the identifier information from the database preset with a plurality of marking instructions after acquiring the identifier information in the second tooth mold; and
performing a marking operation according to the marking instruction to obtain a dental appliance.

In another aspect, an embodiment of the present disclosure includes a computer device, including a memory and a processor, wherein the memory is configured to store at least one program, and the processor is configured to load the at least one program so as to execute the production method of dental instrument in the embodiments.

In another aspect, an embodiment of the present disclosure includes a storage medium, in which a processor-executable program is stored, wherein the processor-executable program, when being executed by the processor, is configured to execute the production method of dental instrument in the embodiments.

Reference signs: 1. control center, 11. database (preset with a plurality of marking instructions), 12. image identification module, 2. laser marking module, 3. acquisition terminal, 31. image acquisition element, 32. first photoelectric sensor, 33. second photoelectric sensor, 34. shadowless light source, 4. workbench, 5. target workpiece, 51. tooth mold, 52. membrane, 53. identifier information, 54. hollowed-out bottom plate, 55. information block, 6. safety door, 7. housing, 8. protection plate, 9. driving device.

DETAILED DESCRIPTION OF EMBODIMENTS

Figure 1:
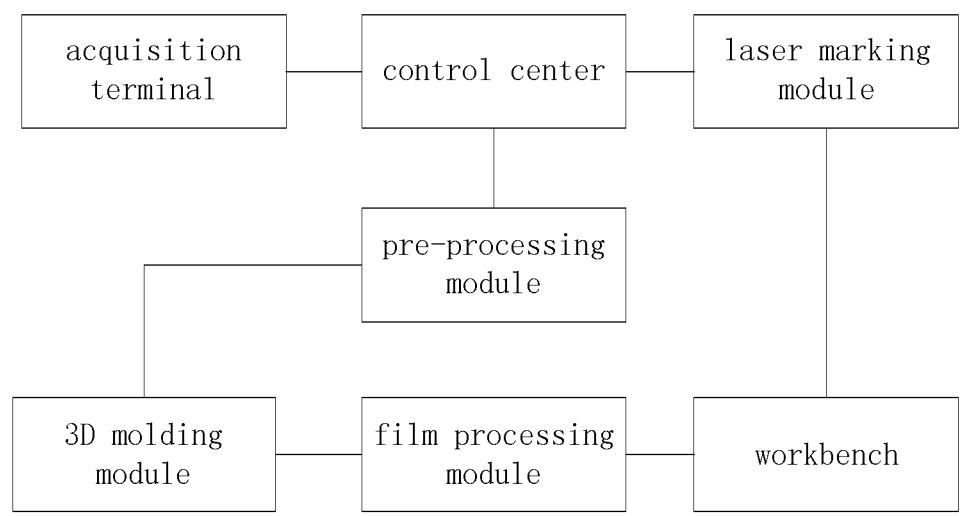
FIG. 1 is a structural block diagram of a marking system for invisible appliance production provided in the present disclosure.

In view of the problems existing in the related art, an embodiment of the present disclosure provides a production system of dental instrument. As shown in FIG. 1, the production system of dental instrument includes a control center, a pre-processing module, a 3D molding module, a film pressing module, a laser marking module, an acquisition terminal, and a workbench. In the above, a pre-processing module is configured to construct a digital three-dimensional model of teeth of a target patient, and perform a pre-processing operation on the digital three-dimensional model. The pre-processing operation includes identifying gum lines on the digital three-dimensional model and adding identifier information to the digital three-dimensional model. The 3D molding module is configured to perform 3D printing according to the digital three-dimensional model to obtain a first tooth mold, and the film pressing module is configured to perform a film pressing process according to the first tooth mold to obtain a second tooth mold. The first tooth mold carries the identifier information, and the second tooth mold includes the first tooth mold and a shell-shaped membrane cladding the first tooth mold, wherein the cladding of the shell-shaped membrane to the first tooth mold may be partial cladding or full cladding, and wherein the partial cladding may be only cladding of positions of the first tooth mold other than a position of the identifier information, or the partial cladding may be only cladding of tooth parts of the first tooth mold with the shell-shaped membrane. The workbench is configured to place the second tooth mold. The acquisition terminal is configured to acquire an image of the second tooth mold. The control center includes a database preset with a plurality of marking instructions and an image identification module, wherein the image identification module positions a region of the identifier information in the image of the second tooth mold based on the GPU and priori knowledge, and after acquiring the identifier information in the second tooth mold based on an optical character recognition algorithm, matches a marking instruction corresponding to the identifier information from the database preset with a plurality of marking instructions, and sends the marking instruction to the laser marking module. The laser marking module is configured to identify an identifier of the second tooth mold, and mark the identifier information to a shell-shaped membrane of the second tooth mold according to an identification result to obtain a dental appliance.

In the present embodiment, the laser marking module includes a laser head, a controller, and a galvanometer, wherein the controller is configured to receive the marking instruction and control movement of the galvanometer according to the marking instruction, and laser of the laser head can reach the second tooth mold after being reflected by the galvanometer, so as to perform the marking operation. A GPU (graphics processing unit) can be used to effectively solve the problems of image processing parallelism and a large computation amount, and greatly shorten the processing time. The priori knowledge refers to bit number, character set, font, orientation, positional relationship used by the identifier information, and relevant hardware parameters. The membrane covers a part of the surface of the tooth mold except the bottom, the acquisition terminal includes an industrial-grade camera, such as a CCD industrial camera. The identifier information may be any combination of characters such as numbers and letters, a bar code or a two-dimensional code. In order to increase the contrast of the character of the identifier information in the picture, and facilitate identification, the identifier information may be presented in the form of hollowed-out characters, raised characters, recessed characters, etc. The tooth mold is generally a hollow tooth mold, a bottom plate is provided at the bottom of the tooth mold to ensure the mechanical property of the tooth mold, besides, the bottom plate is further provided with a hollowed-out hole so as to prevent formation of a cavity inside the tooth mold, which may cause preparation materials (such as photosensitive resin) in the cavity not to be discharged. Without doubt, it can be understood that, in order to prevent hollowed-out hole from affecting the identification effect, there is a preset region on the bottom plate for providing the hollowed-out characters. The operating principle of the above production system of dental instrument is that the control center, after identifying the identifier information in the acquired image of the second tooth mold based on the optical character recognition algorithm, sends the marking instruction to the laser marking module so as to complete the marking on the second tooth mold, thereby realizing automatic identification of identifier information about the second tooth mold, automatically completing the marking on a workpiece, and improving the production efficiency of an invisible appliance. Furthermore, the identifier information can be used to associate the marking instruction and the tooth mold, so as to quickly and accurately find tooth mold information about different patients corresponding to different treatment stages subsequently. In the above, a front side of the tooth mold refers to a side on which the membrane is subjected to the film pressing process, and a back side of the tooth mold refers to a side facing away from the side on which the membrane is subjected to the film pressing process.

Optionally, the marking instruction includes a marking content and marking coordinate information, and the laser marking module performs automatic focusing based on the marking coordinate information.

In the present embodiment, after receiving the marking coordinate information, the laser marking module can learn a position of the marking content on the workpiece, and the laser marking module can perform automatic focusing according to the information.

Optionally, the acquisition terminal is provided with an image acquisition element, a first photoelectric sensor, and a second photoelectric sensor, a first end of the image acquisition element is connected to the first photoelectric sensor, and a second end of the image acquisition element is connected to the second photoelectric sensor, the image acquisition element is configured to acquire the identifier information on the back side of the tooth mold, the first photoelectric sensor is configured to detect a state of the second tooth mold in a workpiece placement area, and the second photoelectric sensor is configured to detect a state of other articles in the workpiece placement area except the second tooth mold.

Figures show that the identifier information is usually placed on the back side of the tooth mold, such that the unsatisfying identification effect caused by the reflection effect of the membrane can be avoided. In the present embodiment, the identifier information can be placed on the front side of the tooth mold or on the back side of the tooth mold, and the acquisition terminal is used to photograph the bottom of the second tooth mold. The acquisition terminal includes the image acquisition element, a first photoelectric sensor, and a second photoelectric sensor, and the first photoelectric sensor and the second photoelectric sensor constitute the workpiece placement area so as to detect a spatial state of the second tooth mold, thus detecting the second tooth mold more accurately. Specifically, the workpiece placement area is provided with the first photoelectric sensor configured to detect whether a workpiece exists in the workpiece placement area, and the image acquisition element is a CCD industrial camera. The camera can be electrically connected to the first photoelectric sensor. When the first photoelectric sensor detects that a workpiece exists in the workpiece placement area, the camera can be allowed to photograph the workpiece. The acquisition terminal (i.e., an image acquisition device) defines a workpiece placement window, and the workpiece placement window is provided with the second photoelectric sensor configured to detect whether an external foreign matter enters the acquisition terminal. The camera can be electrically connected to the second photoelectric sensor. When the second photoelectric sensor detects that a foreign matter enters the acquisition terminal, the camera will be prohibited from photographing, and only when the second photoelectric sensor does not detect the presence of a foreign matter, the camera can be allowed to photograph. The foreign matter is an object that is not a workpiece, such as a human hand or a workpiece holder. Therefore, when a user extends his or her hand through the workpiece placement window for placing a workpiece, the second photoelectric sensor will detect the presence of a foreign matter, and the camera will be prohibited from photographing, thereby avoiding the appearance of human hand features in the workpiece image. Only when the user's hand extends out of the acquisition terminal, the camera is allowed to photograph.

Optionally, the production system of dental instrument further includes a protection plate, wherein the protection plate is arranged at the bottom of the workbench, and the workbench is provided with a transparent or hollowed-out preset region.

In the present embodiment, in order to avoid damage to the acquisition terminal by the laser during the marking, the protection plate is provided at the bottom of the workbench, which can effectively prevent the laser from passing through, so as to ensure that areas of the workbench other than the preset region are not damaged by the laser.

Optionally, the production system of dental instrument further includes a driving device. The driving device is configured to drive the protection plate to adjust an operational state of the protection plate.

In the present embodiment, the driving device is associated with the protection plate that is slidable, then the automation degree of the production system of dental instrument can be improved.

Optionally, the identifier information is disposed on the front side of the tooth mold, the acquisition terminal further may be provided with a shadowless light source and an image acquisition element, and the shadowless light source is configured to reduce the interference of reflection of the membrane on the image of the second tooth mold when the image acquisition element acquires the identifier information.

In the present embodiment, in order to solve the problem of reflection of the membrane when the identifier information is disposed on the front side of the tooth mold, the acquisition terminal is provided as the image acquisition element and the shadowless light source (such as a spherical integral light source). The use of the shadowless light source can reduce the adverse effect of reflection of the membrane on the image acquisition, thereby improving the image quality, and facilitating subsequent operation for image identification.

Optionally, the production system of dental instrument further includes a safety door, and opening and closing states of the safety door are associated with the operation state of the laser marking module.

In the present embodiment, in order to avoid the damage of the laser light source to the human body, a housing and the safety door are provided, and the opening and closing states of the safety door is associated with the operation state of the laser marking module, wherein the safety door can be provided as follows: when the safety door is in the opening state, the laser marking module cannot operate or stops operation immediately, i.e. cannot emit laser; and when the safety door is in the closing state, the laser marking module continues to operate or is in a ready-to-operate state, wherein the ready-to-operate state means that the laser marking module has received an instruction to allow operation, and the laser marking module can start the marking operation at any time.

Optionally, the identifier information is in the form of at least one of hollowed-out characters, raised characters, and groove characters, and the identifier information is set as a combination of numbers and letters.

In the present embodiment, a process of constructing the digital three-dimensional model of target patient's teeth by the control center specifically includes: scanning a patient's oral cavity with an oral scanner to obtain the digital three-dimensional model of teeth. Further, by means of a dental treatment system, according to diagnosis and treatment information about the patient, a corresponding treatment plan can be customized, and a corresponding tooth model (a digital tooth model, not an entity) is generated based on each stage of the treatment plan, and this tooth model can be used to prepare an appliance for a corresponding stage. In addition, a conventional indirect method can also be used, i.e. acquiring the patient's dental impression, and scanning the impression or a plaster cast (reproduced from the impression). After the scanning, the digital three-dimensional model of teeth can be obtained.

In the present embodiment, the process of performing the pre-processing operation on the digital three-dimensional model by the control center includes: acquiring a 3D design model of a dental diagnosis and treatment solution; automatically identifying gum lines on the imported tooth model, and further processing the gum lines according to different application requirements and converting the same into an NC file which can be identified by a numerical control cutting machine; in the present embodiment, automated 3D printing pre-processing is performed on the tooth model, including hollowing out a bottom surface of the tooth model, adding an accessory (i.e., a positioning portion) for fixing tooth model and corresponding identifier information, etc.

In the present embodiment, the 3D molding module is configured to perform 3D printing according to the digital three-dimensional model to obtain the first tooth mold, and the film pressing module is configured to perform the film pressing process according to the first tooth mold to obtain the second tooth mold Herein, the process of producing the dental instrument are described through the following steps S1-S5.

In the present embodiment, the control center executes the following steps:

S1, constructing a digital three-dimensional model of a target patient's teeth; and S2, performing a pre-processing operation on the digital three-dimensional model.

In the present embodiment, step S2 executed by the control center, i.e. the process of performing the pre-processing operation on the digital three-dimensional model, specifically includes the following steps S21-S29.

S21, automatically placing the digital three-dimensional model to a designated position.

Specifically, step S21 of the present embodiment is implemented by the following steps S211-S214.

S211, acquiring a digital three-dimensional model.

Specifically, the imported tooth model (i.e., a digital three-dimensional model) is acquired by acquiring a tooth model in any direction with a bottom surface, wherein the tooth model is a digital three-dimensional body composed of a series of triangular patches.

S212, detecting a largest plane of the digital three-dimensional model.

Specifically, a method of detecting the largest plane of the tooth model is: to set a certain triangular patch, superpose the set triangular patch and the tooth model composed of triangular patches, and set an error threshold e. When e is greater than a certain value, the set triangular patch is not considered as being on the same plane as the patches on the tooth model; otherwise, the set triangular patch is considered as being on the same plane as the patches on the 3D tooth model. When the set triangular patch is on the same plane as a certain patch of the tooth model, the two are superimposed together, and the next triangular patch is continuously searched and the error threshold is judged. The above steps are cycled until the largest plane of the tooth model is obtained. In the process of detecting the largest plane of the tooth model, an equation of the plane thereof can be obtained. Alternatively, individual triangular patches of the digital three-dimensional model are traversed, and the triangular patches having the same normal vector or the normal vectors in which the difference value therebetween is within the preset range are stacked. Then, areas of the triangular patches corresponding to different normal vectors or areas of the stacked planes are compared. The triangular patch or the stacked plane with the largest area is determined as the largest plane.

S213, calculating a first rotation angle and a first rotation axis of the digital three-dimensional model by cross product operation.

Specifically, according to the cross product operation, a rotation angle and a rotation axis are solved according to vector values before and after rotation. The cross product operation is a binary operation of vector in a vector space, and an operation result thereof is a vector rather than a scalar; and an arbitrary model can be rotated to a desired spatial position according to the above rotation angle and rotation axis thereof.

S214, spatially rotating the digital three-dimensional model according to the first rotation angle and the first rotation axis;

S215, projecting the digital three-dimensional model after the spatial rotating into a tooth contour curve; and calculating a direction vector of the digital three-dimensional model before and after the spatial rotation;

S216, calculating a second rotation angle and a second rotation axis of the digital three-dimensional model through the cross product operation according to the direction vector; and S217, performing plane rotation on the digital three-dimensional model according to the second rotation angle and the second rotation axis.

Specifically, after the rotation realized based on step S213, the tooth model is acquired and projected into a tooth contour curve, wherein the tooth contour curve is a planar contour of the object obtained by projecting the object in a 3D space onto a 2D plane. A contour skeleton curve of the tooth model is obtained, which can be represented by a quadratic curve equation. The curve equation is solved, and a direction vector of the tooth model can be obtained. According to the cross product operation, as in step S213, a rotation angle and a rotation axis are solved according to vector values before and after rotation, and the tooth model is rotated to a desired direction position based on a specific plane according to the above rotation angle and rotation axis thereof.

S22, identifying gum lines of digital three-dimensional model by the control center.

In the present embodiment, the process S22 of identifying the gum lines on the digital three-dimensional model by the control center specifically includes the following steps S221-S225.

S221, acquiring initial feature points of the digital three-dimensional model.

Specifically, in the present embodiment, after the tooth model is placed in a designated position, according to a geometric calculation method of curvature, feature points are extracted from the tooth model, and the extracted feature points are filtered and denoised, then a feature contour of the tooth model can be obtained; a curvature geometry calculation method is a method calculating a rotation rate of a tangential direction angle of a certain plane on the tooth model with respect to a corresponding arc length, wherein the rotation rate indicates the degree of concavity and convexity of the certain plane, and is also called as a feature in the present solution. The feature points of a concave-convex area of the tooth model can be acquired by a curvature method (a true gum line on the tooth model is also embodied by concavity and convexity).

S222, denoising the initial feature points to obtain optimal feature points.

Specifically, in the present embodiment, the initial feature points of the tooth model are obtained, and they need to be denoised. In addition to a gum line region, other places of the tooth model also have concavity and convexity, and are also considered as features, and this part will affect subsequent fitting with a contour line, therefore it needs to be filtered or removed, to finally obtain optimal feature points.

S223, determining the contour line by traversing historical data according to the shape and contour of the digital three-dimensional model.

Specifically, in the present embodiment, according to the shape and contour of the imported tooth model, after step S221, an optimal contour line is automatically selected through the placed tooth model, wherein the contour line refers to a gum line file of a tooth, and the file is composed of point coordinates.

It should be noted that, in the present disclosure, before the feature points and the contour line are fitted, an optimal contour line needs to be selected, and the optimal contour line is obtained by traversing historical data according to the shape and contour of the tooth model. The historical data are pre-stored historical data of the gum lines, and these historical data of the gum line can play a reference role in the current gum line identification step. That is to say, in the present embodiment, the optimal contour line is used as a template to fit with the feature points, and to finally obtain an initial fitting line.

S224, fitting the optimal feature points and the contour line to form an initial fitting line.

Specifically, in the present embodiment, an approximation iterative algorithm is used to fit the contour line and the feature points to form the initial fitting line, and the fitting is to project a point of the contour line (which is a series of coordinate points) to a feature point closest thereto; the approximation iteration refers to that after the contour line is projected, iteration is continued until a projection error is less than a set threshold value; and after the iteration is completed, the projected points are connected to form the initial fitting line.

S225, acquiring a contour shape of the digital three-dimensional model by adopting a principal component analysis method according to the initial fitting line; and acquiring a smooth gum line according to the contour shape.

Specifically, since the initial fitting line is not a smooth curve, and there will be local folds and deviations, with regard to this situation, the principal component analysis (PCA) method is used to acquire a main contour shape thereof, and determine points of a main direction of the contour, and the points are smoothly connected, thereby avoiding an unsmooth area of line segment, and obtaining a smooth gum line finally required.

S23, performing acute-angle removal and offset removal processes on the identified gum line to obtain a cutting curve, and converting the cutting curve into an NC file.

Specifically, in the present embodiment, the operations of acute-angle removal and offset removal are performed based on the gum lines to obtain the cutting curve, and then the cutting curve is converted into the NC file. Further description is as follows.

In the present embodiment, post-processing of the gum line can be performed according to different application requirements, for example, mainly including automatic acute-angle removal and overall offset of the gum line. The acute-angle removal of the gum lines means that after the final gum lines are generated, curves thereof are closely fitted with real gum lines. Since an intersection of the teeth is relatively sharp, and does not meet the requirements of the generation process, the gum line need to be flattened at this place, namely removing the acute-angle of the gum line. The offset of the gum lines is similar to the acute-angle removal, wherein the curve is tightly attached to the real gum lines, and does not meet the process treatment requirement after the generation, then a certain margin needs to be reserved, that is, the gum lines are wholly offset downwards (or upwards). The acute angle is limited to be less than 180°, and the overall offset is 0-2 mm.

Subsequently, the determined gum line is converted into data (which can be called as NC file) that can be identified by a computer numerical control (CNC) cutting machine through a tool path algorithm (NC program), and the data are subjected to analog simulation verification, wherein the data of the gum line not passing should be readjusted, and the NC file is generated recurrently until the data passes. Finally an NC cutting file meeting the requirements is output. In the above, the tool path algorithm is a method based on parameters of the machine, such as rotation axis, coordinate setting, rotation speed, to determine the final output NC file data.

The NC file is stored in the database as production information about a corresponding appliance. The identifier information may be associated with the production information of the corresponding appliance so that the production information of the corresponding appliance is interactive. The appliance production information includes marking instruction, cutting instruction and the like. The cutting instruction includes the above NC file.

S24, generating unique identifier information about a corresponding digital three-dimensional model.

In the present embodiment, a proper placement area is found at the bottom of the tooth model according to the field size of the identifier information, such as length and width, and boundary constraints. The identifier information can be adaptively reduced, adjusted in word space, adjusted in font thickness, rotated and the like.

The identifier information of the present embodiment refers to a field composed of numbers and letters of a specific size, thickness, and spacing and generated according to a rule, and a certain character of the identifier information can be verified through other characters, for example, the field includes a number bit and a check bit, characters of the check bit have a mathematical relationship with characters of the number bit, and when a certain character in the number bit cannot be identified, the missing character can be obtained by operating the characters of the check bit and other characters of the number bit. The rule is that the requirement of 3D printing process must be met, that is, usable characters such as English letters A-Z and numbers 0-9 are screened, to form a character library of the identifier information, and as the identifier information is presented by hollowing out, characters such as 0, 9, 8, and A cannot be used due to the existence of identification obstacles. The size and thickness of characters are selected according to the 3D printing process, so that the fonts are clear and visible after the printing is finished. In order to ensure that the characters are not adhered to each other, the space between the characters needs to be kept, and the length of the identifier information is ensured not too long.

S25, placing the identifier information to a corresponding area of the digital three-dimensional model.

Besides, in some embodiments, step S2 of the present disclosure further includes:

S26, segmenting the digital three-dimensional model to obtain several slice layers;

S27, hollowing out the digital three-dimensional model;

S28, performing grid filling processing on a bottom plate of the digital three-dimensional model.

Specifically, the pre-processing in the present embodiment further includes a slicing operation, i.e., segmenting the tooth model to obtain a plurality of slice layers, and the slice layers are exported as a slice print file.

The present embodiment further includes performing operations such as hollowing out the tooth model and grid filling the bottom plate. In this way, the mechanical performance of the tooth mold can be ensured while reducing the weight of the tooth mold and reducing the amount of printing material. The bottom plate of the tooth model means that as the printed tooth mold is hollowed out or hollow, and in order to prevent the problems of the tooth mold such as deformation and shrinkage, the printed tooth mold needs to be added with the bottom plate to overcome deformation, and in addition, as factors such as liquid leakage, material saving, and process processing need to be considered, the bottom plate needs to be added to the tooth model and made into a honeycomb shape. In the above, the liquid leakage refers to that resin in the cavity of the tooth mold flows out during the printing process.

S29, providing a positioning portion at the bottom of the digital three-dimensional model.

Specifically, in the pre-processing of the present embodiment, the positioning portion also can be provided at the bottom of the tooth model, and the positioning portion can cooperate with a jig of a processing device, for example, a marking machine, a film pressing machine, and a cutting machine, the positioning portion can be in the shape of a bump, a groove, a hole and the like, and preferably, the positioning portion is three positioning holes.

The three positioning holes can be used as a reference for positioning a marking position, and a cutting line position (i.e., a start position in the NC file). For example, a tooth model coordinate system can be established through the three positioning holes, and in the tooth model coordinate system, a marking position and a cutting line position corresponding to the current tooth model are preset, so that the marking position and the cutting line position can be determined according to the three positioning holes. In other words, in a processing device, the tooth mold is fixed and positioned by the positioning portion, that is, the positioning of the marking position or the cutting line position is completed.

Since the positioning portion needs to frequently cooperate with a jig of the processing device, a certain strength is required, and the tooth mold is usually a hollow tooth mold (i.e., a cavity exists inside the tooth mold), the positioning portion of the tooth mold further includes positioning blocks, and the positioning holes are defined in the positioning blocks. The shape of the positioning blocks is not limited, and may be a cylinder, a rectangular block, or the like.

There are three positioning blocks, respectively corresponding to the three positioning holes. Specifically, as shown in FIG. 2 and FIG. 3, the positions of the positioning blocks are respectively located in the middle (corresponding to central incisor position of the tooth mold) and two end portions (corresponding to molar positions of the tooth mold) of the tooth mold.

As the dimension of the positioning holes is relatively determined, the dimension of the positioning blocks is also relatively determined, however, as the tooth mold of each patient is unique, and the tooth mold corresponding to each treatment stage will also change, this will cause a situation that the positioning blocks protrude from a side surface of the tooth mold if the positioning blocks is too large. Therefore, in the three positioning blocks, at least one positioning block needs to satisfy the following condition: a distance h between an exposed part of the positioning block and an adjacent gum line needs to be greater than or equal to a preset safe distance. Specifically, the adjacent gum line refers to a gum line segment corresponding to the exposed part of the positioning block, and the width of the gum line segment is greater than or equal to the width of the exposed part of the positioning block. The distance h specifically refers to the smallest distance between the gum line segment and the positioning block. When h is greater than or equal to the preset safe distance, a cutter of the cutting machine does not interfere with the positioning blocks when in operation.

Figure 2:
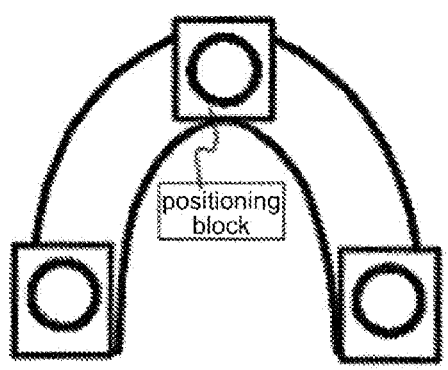
FIG. 2 is a first position schematic view of a positioning block of a tooth mold of an embodiment of the present disclosure.
Figure 4:
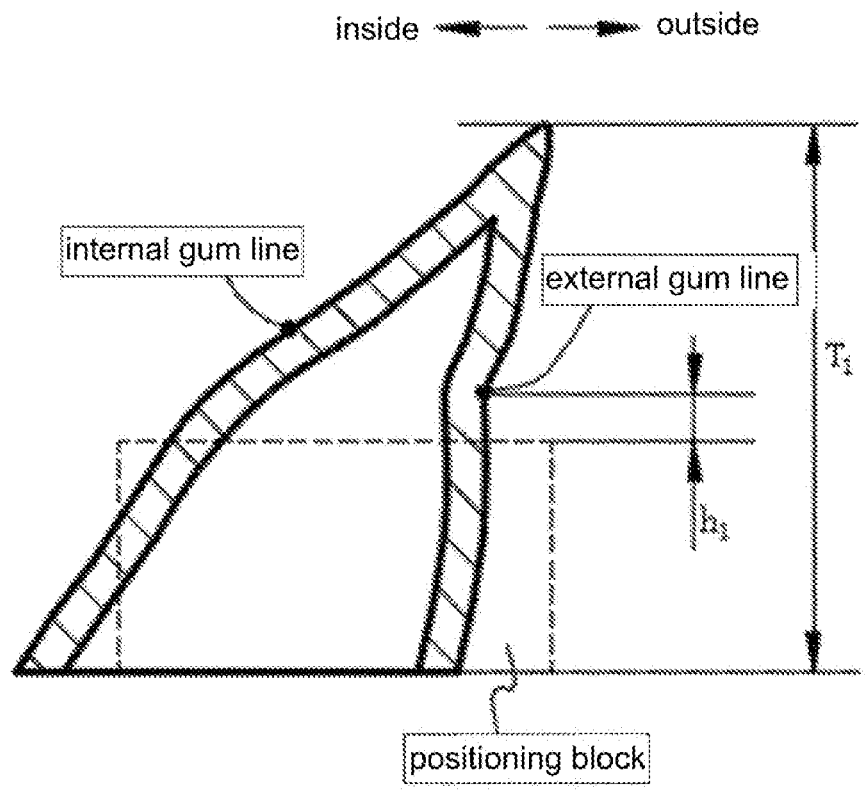
FIG. 4 is a first position side view of the positioning block of the tooth mold of an embodiment of the present disclosure.

In the present embodiment, taking the positioning block located in the middle of the tooth mold shown in FIG. 2 as an example, referring to FIG. 2 and FIG. 4, the size of the positioning block may be too large, so that the positioning block may be exposed at an outer side of the tooth mold and exposed at an inner side of the tooth mold, and as the gum lines of the tooth mold include an external gum line segment and an internal gum line segment, the smallest distance between the external gum line segment and the positioning block and the smallest distance between the internal gum line segment and the positioning block need to be compared, the smaller value of the two is selected as the distance h, and then the distance h (i.e., h1 in FIG. 4) is compared with the preset safe distance. Specifically in FIG. 4, the distance h1 between the positioning block and the external gum line segment needs to be greater than or equal to the preset safe distance.

Figure 3:
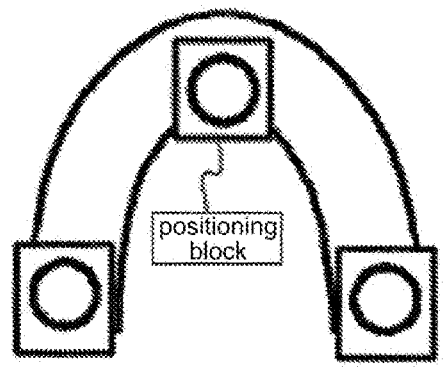
FIG. 3 is a second position schematic view of the positioning block of the tooth mold of an embodiment of the present disclosure.
Figure 5:
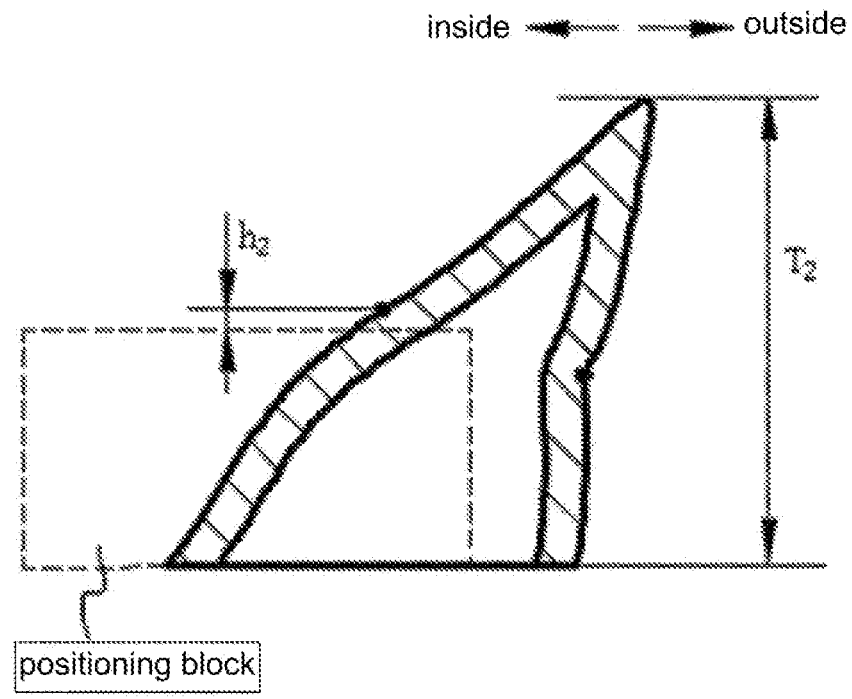
FIG. 5 is a second position side view of the positioning block of the tooth mold of an embodiment of the present disclosure.

Referring to FIG. 3 and FIG. 5, the position of the positioning block also may affect an overall height T of the tooth mold, when the positioning block is provided at the inner side of the tooth mold, the distance h (i.e., h2 in FIG. 5) is the smallest distance between the internal gum line segment and the positioning hole, and in the premise of ensuring the distance h2 to be greater than or equal to the preset safe distance, an overall height T2 of the tooth mold can be appropriately adjusted, for example, the features of the bottom of the tooth mold can be appropriately cut down, thus reducing the overall height T2 of the tooth mold. It can be understood that the features of the bottom of the tooth mold (including a part of gum features) have a lower usage value than tooth features of the tooth mold, therefore, on the premise of ensuring that the tooth features are complete and the gum lines are displayed completely without affecting the operation of the cutter of the cutting machine, the features of the bottom of the tooth mold can be appropriately cut down.

By comparing FIG. 4 and FIG. 5, it can be seen that the position of the positioning block may affect the overall height of the tooth mold, and further affect the printing time and the material amount of the 3D printing. It can be found that, when the positioning block is exposed at the outer side of the tooth mold in the manner shown in FIG. 4, the overall height of the tooth mold is T1. When the positioning block is provided at the inner side of the tooth mold in the manner as shown in FIG. 5, the overall height of the tooth mold is T2, and obviously, T1 is greater than T2. It should be noted that the position of the positioning block cannot be moved towards the inner side of the tooth mold without limitation, because when the positioning block in the middle of the tooth mold is moved towards the inner side of the tooth mold, positions of the other two positioning blocks may also change correspondingly (positions of the three positioning holes are relatively fixed, and restrict each other), when the positioning block in the middle of the tooth mold moves towards the inner side of the tooth mold without limitation, the other two positioning blocks may be disconnected from two ends of the tooth mold, or may cause the distance h corresponding to the other two positioning blocks to be less than the preset safe distance.

Therefore, in the present solution, the positions of the positioning blocks need to balance the mutual influence of the distance h and the overall height T of the tooth mold.

S3, performing 3D printing according to the digital three-dimensional model, to obtain a first tooth mold, wherein the first tooth mold carries identifier information.

Specifically, the 3D printing manner in the present embodiment may be photo-cured 3D printing (SLA, DLP, LCD), 3DP, MJF, FDM, Polyjet, etc.

After receiving the slice printing file, the printer can print the slice layers layer by layer, stack the slice layers layer by layer, and finally obtain a three-dimensional physical tooth mold. A bottom of the physical tooth mold is provided with an identification code and positioning holes. Further, after the 3D printing, a post-processing step is further included, and the post-processing step can be selected according to the type of 3D printing technique. For example, when the photo-cured 3D printing technique is employed, the post-processing step may select steps such as post-curing and washing.

S4, performing a film pressing processing according to the first tooth mold to obtain a second tooth mold, wherein the second tooth mold includes the first tooth mold and a shell-shaped membrane cladding the first tooth mold.

Specifically, in the present embodiment, after the tooth mold is printed, a pre-heated polymer material membrane is film-pressed on the tooth mold to form the shell-shaped membrane.

Preferably, an image acquisition terminal may be provided in a film pressing machine, the image acquisition terminal may identify the identifier information by photographing the bottom of the tooth mold, and send the identifier information to a server, and the server calls a corresponding film pressing instruction from the database according to the identifier information, wherein the film pressing instruction may include a pressure parameter, a preheating time of the membrane, a film pressing temperature, etc.

In the present embodiment, after the film pressing procedure, a tooth mold with a membrane coated on the surface can be obtained. Then, with regard to the tooth mold, a camera is used to take a picture of a bottom surface of the tooth mold to obtain picture information about the tooth mold. Next, an image processing is performed on the picture of the tooth mold, to satisfy the picture quality required by an identification system. A region where the identifier information is located is positioned based on GPU with the priori knowledge, and is framed out. Orientation of the obtained framed picture is automatically rotated. The identifier information is identified using in-depth learning algorithm, and an optimal identification result is selected using a cross-validation method.

S5, identifying an identifier of the second tooth mold, and performing the marking processing and/or a cutting processing on the second tooth mold according to the identification result to obtain a dental appliance.

In the marking and cutting procedures in the present embodiment, the image acquisition terminal (CCD) is used to photograph the bottom of the tooth mold (a membrane is attached to the surface of the tooth mold), then the identifier information is identified through the OCR technology, the identifier information is sent to a server, and the server calls a corresponding marking instruction or cutting instruction from the database according to the identifier information.

In the marking processing, the marking instruction will be transmitted to the marking machine, and after receiving the marking instruction corresponding to the current tooth mold, the marking machine performs the marking processing on the second tooth mold, and generates a marking content on a surface of the second tooth mold, i.e. generating the marking content on the shell-shaped membrane. Specifically, the marking machine is a laser marking machine. In the cutting procedure, the cutting instruction will be transmitted to the cutting machine, and when the cutting machine receives the cutting instruction, the cutter of the cutting machine will cut the shell-shaped membrane of the second tooth mold along a cutting curve according to the NC file in the cutting instruction, to remove superfluous parts on the shell-shaped membrane, and obtain the dental appliance. It can be understood that the dental appliance is mainly used for correcting teeth, and the superfluous parts on the shell-shaped membrane have no effect on the teeth correction and may damage the gums, therefore the superfluous parts need to be removed.

Specifically, the OCR identification process of the present embodiment includes the following steps.

S51, photographing a picture of the bottom surface of the tooth mold with the image acquisition terminal, to obtain picture information about the tooth mold; and performing an image processing on the picture of the tooth mold, to satisfy the picture quality required by the identification system.

Specifically, in the present embodiment, a camera is used to photograph the tooth mold to obtain the picture and perform the image pre-processing.

With regard to the above special tooth mold morphology and production environment thereof, the selected camera has red light assistance, which helps to reduce membrane reflection, and the camera is a wide-angle lens camera, so that the lens can be placed closer in the present solution, the volume of the device can be reduced, and the selected camera can effectively satisfy the conditions of anti-interference and light weight.

Finally, in order to obtain the required identifier information, the image pre-processing is performed on the acquired picture, and the tooth mold and the membrane are segmented based on an image threshold value, connectivity, and morphological operation, to obtain a segmentation result.

S52, positioning a region where the identifier information is located in the image based on the GPU and the priori knowledge, and framing out the same.

Specifically, in the present embodiment, a segmented picture is acquired, a target position is found based on a neural network and the priori knowledge and is framed out, and then GPU is used to realize real-time positioning of words.

GPU is a graphics processing unit, and in the present solution, the utilization of the GPU can effectively solve the problems of image processing parallelism and a large computation amount, thereby greatly shortening the processing time.

A character detection algorithm based on in-depth learning is used to first calculate a word probability at each pixel point in the image, calculate an approximate position of each character by performing optimization analysis on a probability map, and remove and fill the identification result based the priori knowledge, wherein the priori knowledge refers to bit number, character set, font, orientation, positional relationship, and relevant hardware parameters used by the identifier information.

Finally, a final character box position is determined according to the approximate position of the character and a priori condition, that is, the positioning of the identifier information and definition of the range are completed.

S53, automatically rotating a picture orientation of the obtained framed picture.

Specifically, in the present embodiment, the picture orientation of the obtained framed picture is automatically rotated.

As the tooth mold is in any direction, the identifier information is also in any direction, and in order to accurately identify the identifier information, the framed picture needs to be straightened, i.e. automatically rotating the picture to be straight. A rotation method is automatically straightening the picture with a center of the framed picture as a rotation axis, that is, making a main direction parallel to a horizontal direction.

S54, identifying identifier information in the framed picture with an in-depth learning algorithm, and selecting an optimal identification result with a cross-validation method.

Specifically, in the present embodiment, the identifier information is identified using the in-depth learning algorithm, and the optimal identification result is selected with the cross-validation method.

The in-depth learning algorithm is a method that can interpret data such as text, image, and sound in a learning process, and can identify the data such as text, image, and sound by learning inherent laws and representation levels of acquired data from the sample data. In the present solution, a special processing is performed according to the font type and size of the identifier information, and sample data of the identifier information is trained and used for identification, and specific identification steps are as follows:

S541, performing a normalization pre-processing on the information, that is, denoising and contrast enhancement;

S542, predicting a character in the framed picture, outputting a prediction result of character unit and a set of degree of confidence;

S543, outputting an optimal identification result by combining a character library and calibration bit.

More specifically, in the present embodiment, an identifier information identification algorithm is designed and implemented based on in-depth learning, and identification accuracy is further improved through model integration. The embodiment of the present disclosure designs and implements the following two in-depth learning models.

Model 1: multilayer small convolution kernel neural network model. A multilayer small convolution kernel model is designed according to the size of a cropped text region, with a fixed number of character bits in output layer. Two, positive and negative, characters are trained for each bit at the same time. The model is trained with an automatically generated data set, and the training set includes data such as different fonts, font sizes, rotation, ambiguity, and noise.

Model 2: LSTM-based network model. This model is mainly optimized for text line identification, can assist outputting objective character layout analysis, and can correct the situation of text tilting/shifting in a box by combining secondary identification. The training set uses a random text line input in a positive direction, has a fixed font, and meanwhile also includes data such as ambiguity and noise used by the training set of the model 1.

After the identification result is obtained according to the above steps, the present solution still needs to perform multi-dimensional verification of the identification result, including:

(1) In the present embodiment, the identifier information is generated according to a certain rule, that is, a certain character of the identifier information can be verified by other characters, and due to the influence of 3D printing process, the identifier information may be filled or have defects caused by post-processing process, thus, the identification is affected. The present method performs self-verification on the identifier information aiming at this problem, and effectively solves the identification difficulty caused by incomplete or ambiguous identifier information. For example, a mathematical relationship exists between characters in the identifier information, and when one character therein is missing or unidentifiable, the missing or unidentifiable character may be obtained according to the mathematical relationship through other characters.

(2) In order to make the identification result more stable and accurate, the main direction of the framed picture is rotated twice (being parallel to the horizontal direction) for identification, and a result with the highest degree of confidence therein is selected as a final result. Since it is not known whether the rotated identifier information is placed upright or upside down, two times of identification is needed, to select the highest degree of accuracy.

Finally, according to the optimal identification result, the marking processing and/or cutting processing is performed on the second tooth mold.

Demolding processing is performed on the second tooth mold to obtain the dental appliance.

Figure 6:
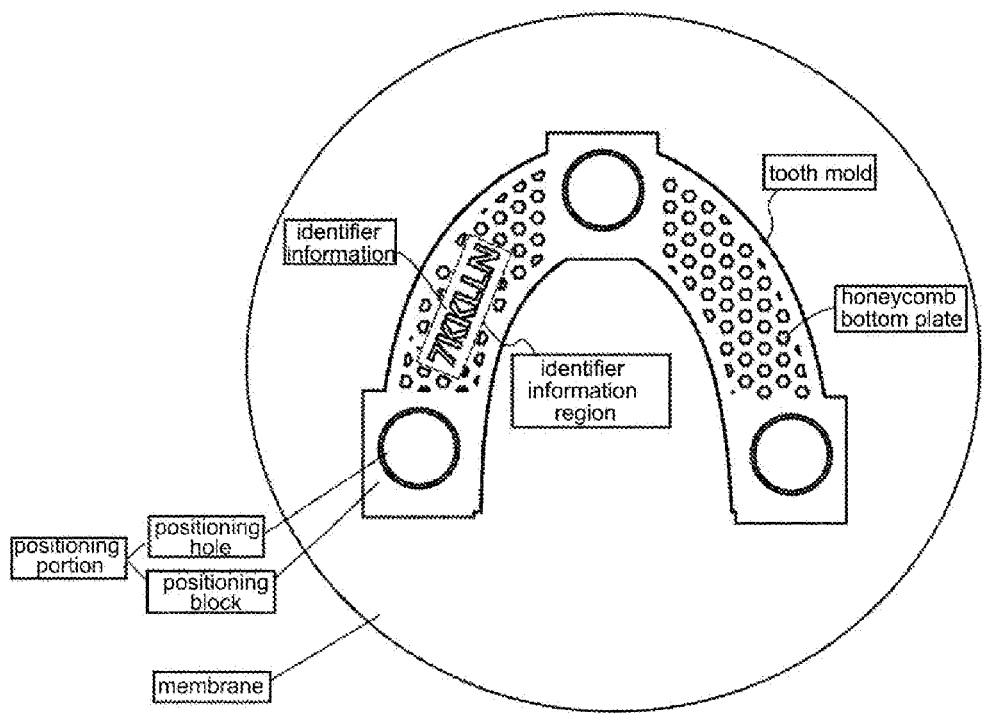
FIG. 6 is a schematic view of a bottom of the tooth mold in a marking process in an embodiment of the present disclosure.
Figure 7:
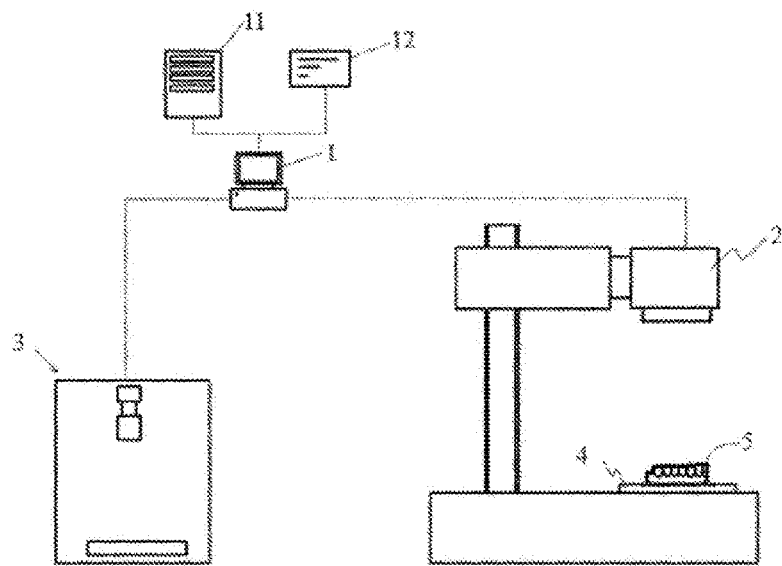
FIG. 7 is a schematic view of the marking system for invisible appliance production provided in an embodiment of the present disclosure.

As shown in FIG. 6, in the process of marking processing, positions of the identifier information, the tooth mold, the honeycomb bottom plate, the identifier information region, the membrane, the positioning blocks, and the positioning holes are as shown in FIG. 6, wherein a positioning hole and a corresponding positioning block constitute a corresponding positioning portion.

In addition, working environments of various procedures of the present embodiment are different, thus workpieces, such as the tooth mold and the membrane, can be transported by a transport cart (robot).

After the cutting step is completed, demolding is further included to separate the appliance (the shell-shaped membrane machined by cutting) from the tooth mold. Further, the appliance can be further processed, such as grinding, to obtain a molded dental appliance.

In the present embodiment, a process in which the laser marking module identifies the identifier of the second tooth mold and performs the marking processing on the second tooth mold according to the identification result is described in the following Embodiments 1 to 4.

Embodiment 1

The present embodiment provides a structure of a production system of dental instrument. Referring to FIG. 7 to FIG. 10, a control center 1, a laser marking module 2, an acquisition terminal 3, a workbench 4, a second tooth mold 5, a safety door 6, and a housing 7 are included, and a 3D molding module is not shown in FIG. 7 to FIG. 10. In the above, an output end of the control center 1 is connected to the laser marking module 2, and an input end of the control center 1 is connected to the acquisition terminal 3, wherein the control center 1 includes a database 11 preset with a plurality of marking instructions and an image identification module 12, the acquisition terminal 3 includes an image acquisition element 31, a first photoelectric sensor 32, and a second photoelectric sensor 33, the second tooth mold 5 includes a tooth mold 51 and a membrane 52, and referring to FIG. 11, identifier information 53 is placed on a back side of the tooth mold 51, and a hollowed-out bottom plate is provided on the back side of the tooth mold 51.

Specifically, the acquisition terminal 3 acquires an image of the second tooth mold 5 disposed on the workbench 4, and transmits the acquired image of the second tooth mold to the control center 1, the image identification module 12 built in the control center 1, after identifying the identifier information 53 about the acquired image of the second tooth mold based on an optical character recognition algorithm, matches a marking instruction corresponding to the identifier information 53 from the database 11 preset with a plurality of marking instructions, and sends the marking instruction to the laser marking module 2 to complete marking on the second tooth mold 5.

Figure 8:
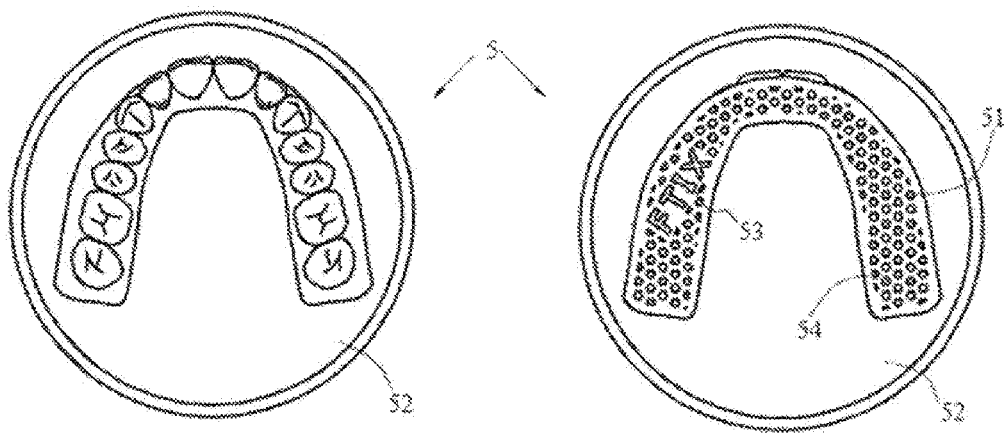
FIG. 8 is a schematic view of a target workpiece with identifier information being disposed on a back side of the tooth mold provided in an embodiment of the present disclosure.

As shown in FIG. 8, in order to reduce the weight of the tooth mold 51 and reduce the amount of material used, the tooth mold 51 is generally a hollow tooth mold, and in order to ensure the mechanical performance of the tooth mold, a bottom plate 54 is provided at the bottom of the tooth mold 51, furthermore, in order to prevent formation of a cavity inside the tooth mold, and cause preparation materials (such as photosensitive resin) in the cavity not to be discharged, the bottom plate is further provided with a hollowed-out hole. Without doubt, it can be understood that, in order to prevent hollowed-out hole from affecting the identification effect, there is a preset region on the bottom plate for providing the hollowed-out characters (i.e. identification information).

Figure 9:
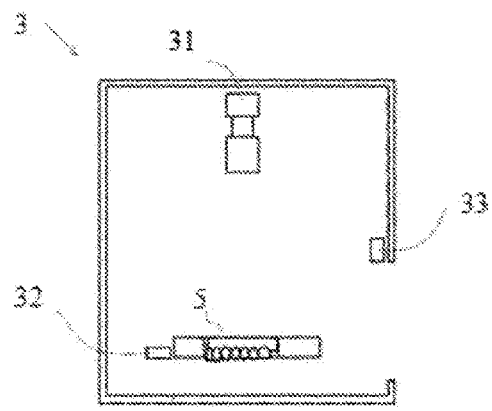
FIG. 9 is a structural schematic view of an acquisition terminal provided in an embodiment of the present disclosure.

As shown in FIG. 9, the acquisition terminal includes an image acquisition element 31, a first photoelectric sensor 32, and a second photoelectric sensor 33, and the first photoelectric sensor 32 and the second photoelectric sensor 33 are both connected to the image acquisition element 31, wherein the first photoelectric sensor 32 is configured to detect whether the second tooth mold 5 exists in a workpiece placement area, the second photoelectric sensor 33 is placed in a workpiece insertion window for detecting whether an external foreign matter enters, and when the first photoelectric sensor 32 detects that a workpiece exists in the workpiece placement area, the image acquisition element 31 is allowed to photograph the workpiece. When the second photoelectric sensor 33 detects that a foreign matter enters the acquisition terminal, the image acquisition element 31 will be prohibited from photographing, and only when the second photoelectric sensor 33 does not detect the presence of a foreign matter, the image acquisition element 31 can be allowed to photograph. The foreign matter is an object that is not a workpiece, such as a human hand or a workpiece holder. Therefore, when a user extends his or her hand through the workpiece placement window for placing a workpiece, the second photoelectric sensor 33 will detect the presence of a foreign matter, and the image acquisition element 31 will be prohibited from photographing, thereby avoiding the appearance of human hand features in the workpiece image. Only when the user's hand extends out of the acquisition terminal, the image acquisition element 31 will be allowed to photograph.

Figure 10:
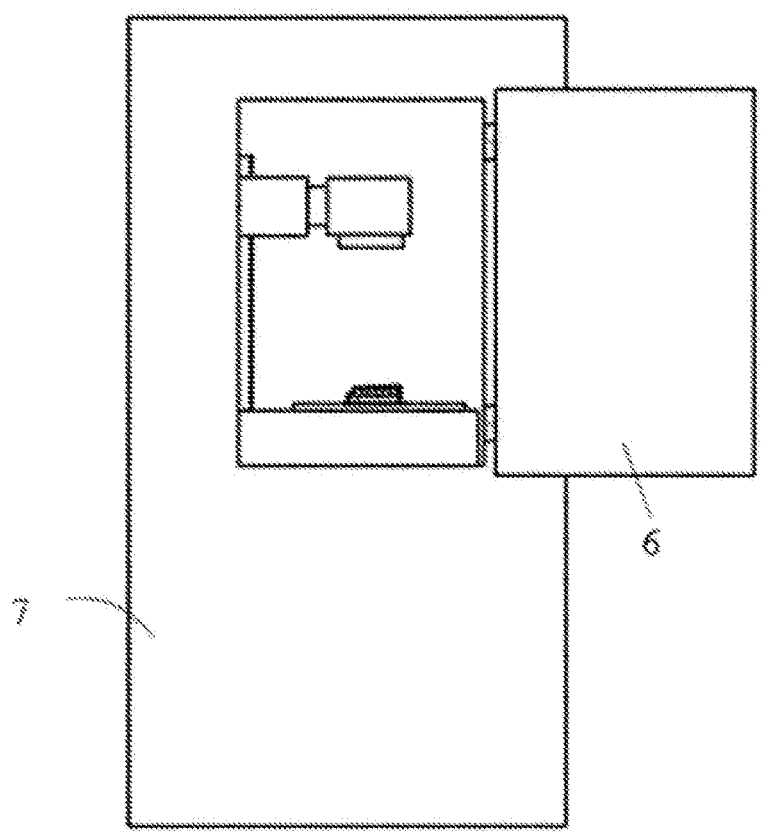
FIG. 10 is a structural schematic view of a marking system provided with a safety door provided in an embodiment of the present disclosure.
Figure 11:
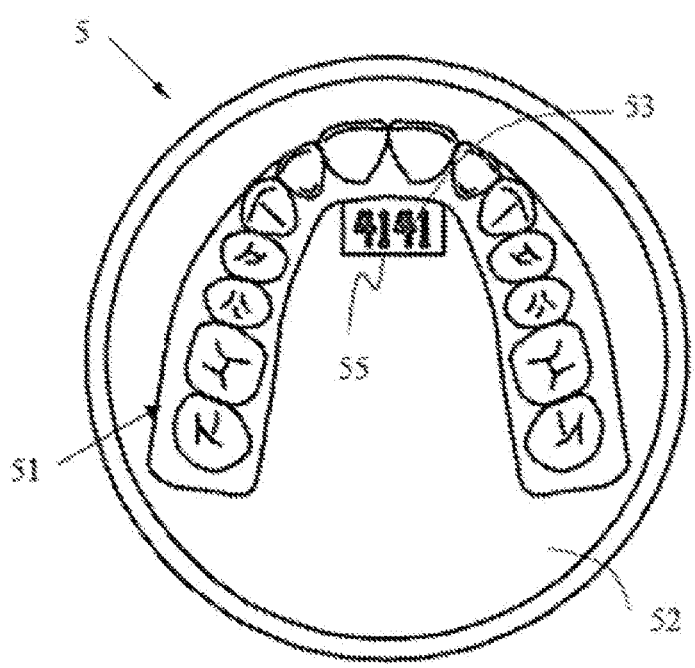
FIG. 11 is a schematic view of a target workpiece with identifier information being disposed on a front side of the tooth mold provided in an embodiment of the present disclosure.

As shown in FIG. 10, as a part of the laser light source may cause damage to the human body (e.g. eyes and hands), for the sake of safety, a production system of dental instrument is provided with the housing 7 and the safety door 6. The opening and closing states of the safety door 6 are associated with the operation state of the laser marking module 2.

The safety door 6 can be provided as follows: when the safety door 6 is in the opening state, the laser marking module 2 cannot operate or stop the operation immediately, i.e. cannot emit laser. When the safety door 6 is in the closing state, the laser marking module 2 continues to operate or is in a ready-to-operate state, wherein the ready-to-operate state means that the laser marking module 2 has received an instruction to allow operation, and the laser marking module 2 can start the marking operation at any time.

Embodiment 2

Figure 12:
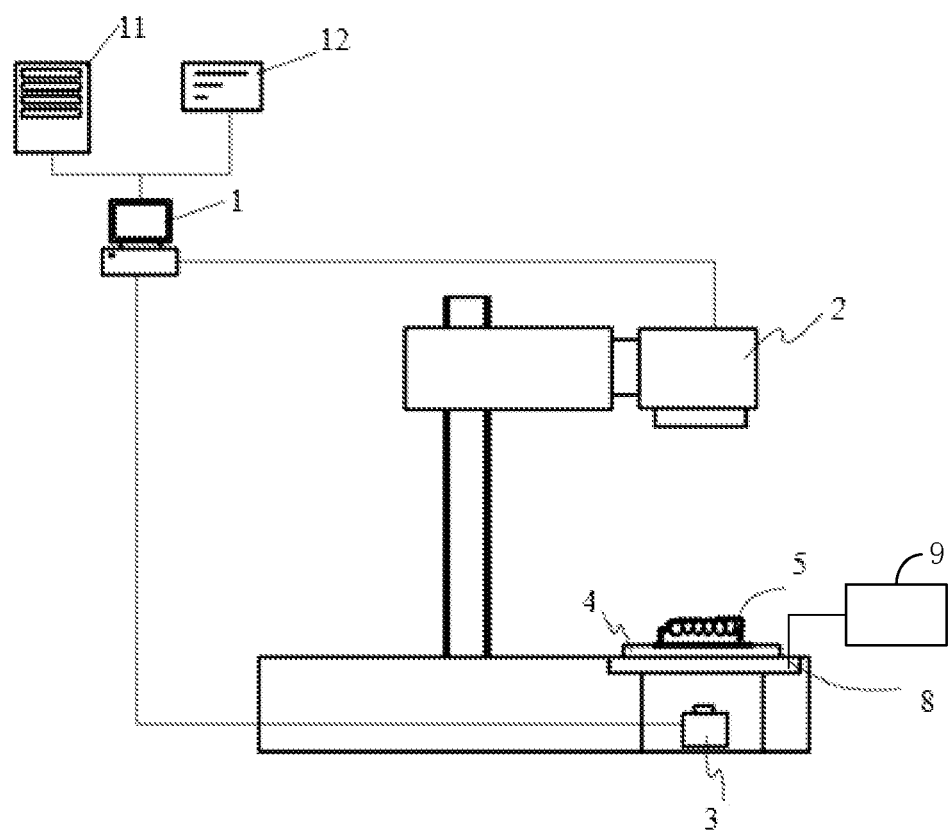
FIG. 12 is a schematic view of another marking system for invisible appliance production provided in an embodiment of the present disclosure.

Referring to FIG. 8 and FIG. 12, on the basis of Embodiment 1, the present embodiment provides another production system of dental instrument, including a control center 1, a laser marking module 2, an acquisition terminal 3, a workbench 4, a second tooth mold 5, a protection plate 8, and a driving device 9, wherein the laser marking module 2, the workbench 4, and the acquisition terminal 3 are placed from top to bottom. Moreover, the control center 1 includes a database 11 preset with a plurality of marking instructions and an image identification module 12, the acquisition terminal 3 includes an image acquisition element 31, a first photoelectric sensor 32, and a second photoelectric sensor 33, the second tooth mold 5 includes a tooth mold 51 and a membrane 52, wherein identifier information 53 is placed on a back side of the tooth mold 51, and a hollowed-out bottom plate is provided on the back side of the tooth mold 51.

As shown in FIG. 12, in order to prevent the laser from damaging the image acquisition terminal 3 when marking, the protection plate 8 that is slidable is provided at the bottom of the workbench 4, and the protection plate 8 is configured to prevent the laser from passing through.

Besides, a driving device 9 is provided in association with the protection plate 8 that is slidable, so that the driving device 9 can be configured to drive the protection plate 8 to be opened and closed. Specifically, the second tooth mold 5 is placed above the workbench 4, and the driving device 9 drives the protection plate 8 to be opened. Then, after the acquisition terminal 3 completes the photographing, the driving device 9 drives the protection plate 8 to be closed. Subsequently, the acquisition terminal 3 sends the image of the second tooth mold to the control center 1, the image identification module 12 built in the control center 1, after identifying the image of the second tooth mold based on an optical character recognition algorithm, matches a marking instruction from the database 11 preset with a plurality of marking instructions, and sends the corresponding marking instruction to the laser marking module 2. Finally, the laser marking module performs a laser marking operation on the workpiece according to the received marking instruction. Thus, continuous identification of the identifier information and the marking are realized.

Embodiment 3

Figure 13:
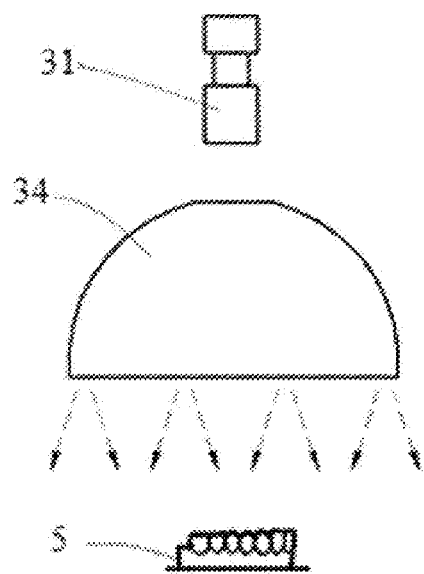
FIG. 13 is a structural schematic view of the acquisition terminal provided with a shadowless light source provided in an embodiment of the present disclosure.
Figure 14:
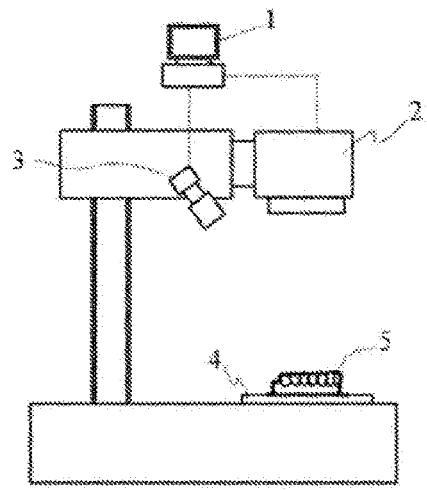
FIG. 14 is a schematic view of the marking system for invisible appliance production provided with a shadowless light source provided in an embodiment of the present disclosure.

Referring to FIG. 13 and FIG. 14, a production system of dental instrument is provided for addressing reflection of membrane when identifier information is placed on a front side of a tooth mold, including a control center 1, a laser marking module 2, an acquisition terminal 3, a workbench 4, and a second tooth mold 5, wherein the acquisition terminal 3 includes an image acquisition element 31 and a shadowless light source 34, the second tooth mold 5 includes a tooth mold 51 and a membrane 52, an information block 55 is provided on the front side of the tooth mold 51, and identifier information 53 is provided on the information block 55.

Specifically, in combination with the shadowless light source 34 and the image acquisition element 31, the interference of reflection of the membrane 52 on the acquisition of the second tooth mold 5 can be effectively reduced, so as to realize identification of the front side of the second tooth mold 5.

Optionally, the acquisition terminal 3 may be provided next to the laser marking module 2 (as shown in FIG. 14), and also may be directly provided on the laser marking module 2, so that the laser marking module 2 and the acquisition terminal 3 share one workbench 4, and after the second tooth mold 5 is placed on the workbench 4, the steps of identifying the identifier information and marking are realized continuously, thus greatly improving the operation efficiency.

Embodiment 4

Figure 15:
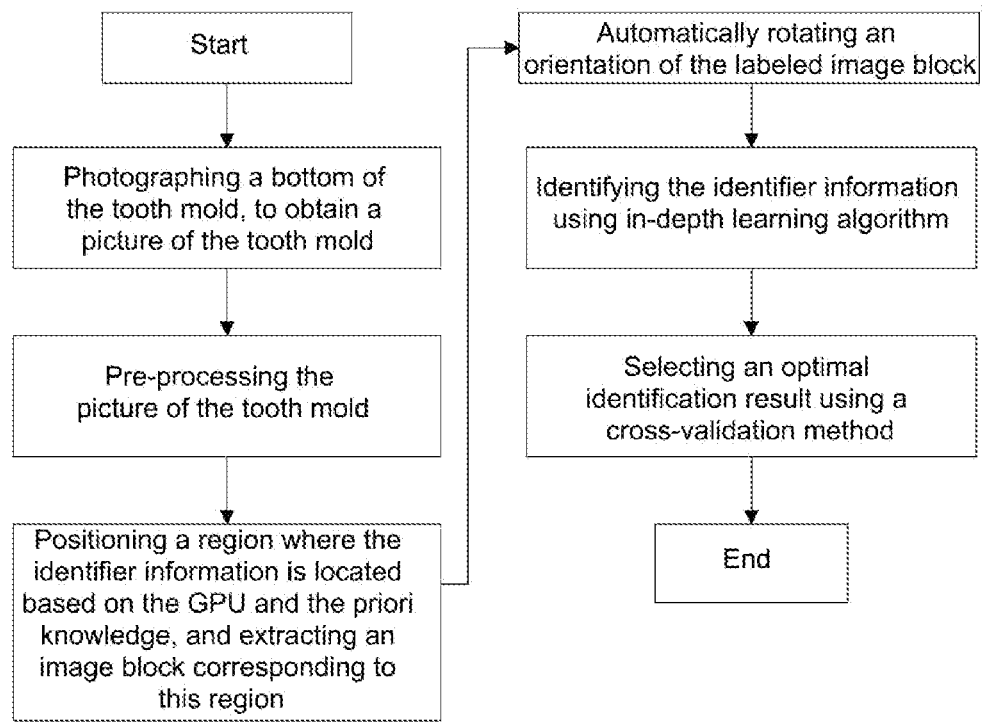
FIG. 15 is a flow chart of the marking method for invisible appliance production provided in an embodiment of the present disclosure.

As shown in FIG. 15, a marking method for appliance production is provided, which specifically includes the following flow.

In the marking procedure, a bottom of a tooth mold (a membrane is attached to a surface of the tooth mold) is photographed by an image acquisition terminal (CCD), then identifier information is identified through the OCR technology, the identifier information is sent to a server, and the server calls a corresponding marking instruction from a database according to the identifier information.

1) Taking a picture of the bottom surface of the tooth mold with the image acquisition terminal, to obtain a picture of the bottom of the tooth mold; and performing an image pre-processing on the picture of the tooth mold, to satisfy the picture quality required by the identification.

The bottom of the tooth mold is photographed by the image acquisition terminal, to obtain the picture, and perform image pre-processing.

With regard to the above special tooth mold morphology and production environment thereof, the selected camera has red light assistance (reducing membrane reflection), and the camera is a wide-angle lens camera, and the selected camera can effectively satisfy the conditions of anti-interference and light weight.

In order to obtain the required identifier information, the image pre-processing is performed on the acquired picture, and the tooth mold and the membrane are segmented based on an image threshold value, connectivity, and morphological operation, to obtain a segmentation result.

2) Positioning a region where the identifier information is located based on the GPU and the priori knowledge, and extracting an image block corresponding to this region.

The segmented picture is acquired, the position of the identifier information is found based on a neural network and the priori knowledge and framed out, and then GPU is used to realize real-time positioning of words.

GPU is a graphics processing unit, and in the present solution, the utilization of the GPU can effectively solve the problems of image processing parallelism and a large computation amount, thereby greatly shortening the processing time.

A character detection algorithm based on in-depth learning is used to first calculate a word probability at each pixel point in the image, calculate an approximate position of each character by performing optimization analysis on a probability map, and remove and fill the identification result based the priori knowledge, wherein the priori knowledge refers to bit number, character set, font, orientation, positional relationship, and relevant hardware parameters used by the identifier information.

Finally, a final text box position is determined according to an approximate text position and priori condition, that is, the positioning of the identifier information and delineation of the range are completed.

3) Straightening the direction of the picture, i.e., rotating the orientation of the image block.

A picture orientation of the obtained framed picture is automatically rotated.

As the arrangement direction of the tooth model is uncertain, and the orientation of the identifier information is also uncertain, in order to accurately identify the identifier information, the framed picture needs to be straightened, i.e. automatically rotating the picture to be straight, so as to improve the identification accuracy. A rotation method is automatically straightening the picture with a center of the framed picture as a rotation axis, that is, making a main direction parallel to a horizontal direction.

4) Identifying identifier information in the image block with an in-depth learning algorithm, and 5) selecting an optimal identification result with a cross-validation method.

The in-depth learning algorithm is a method that can interpret data such as text, image, and sound in a learning process, and can identify the data such as text, image, and sound by learning inherent laws and representation levels of acquired data from the sample data. In the present solution, a special processing is performed according to the font type and size of the identifier information, and sample data of the identifier information is trained and used for identification, and specific identification steps are as follows:

(1) performing a normalization pre-processing on the information, that is, denoising and contrast enhancement;

(2) predicting a font, outputting a prediction result of character unit and a set of degree of confidence;

(3) outputting an optimal identification result by combining a character library and calibration bit.

More specifically, in the system, an identifier information identification algorithm is designed and implemented based on in-depth learning, and identification accuracy is further improved through model integration. The present system designs and implements the following two in-depth learning models.

Model 1: multilayer small convolution kernel neural network model. A multilayer small convolution kernel model is designed according to the size of a cropped text region, with a fixed number of character bits in output layer. Two positive and negative characters are trained for each bit at the same time. The model is trained with an automatically generated data set, and the training set includes data such as different fonts, font sizes, rotation, ambiguity, and noise.

Model 2: LSTM-based network model. This model is mainly optimized for text line identification, can assist outputting objective character layout analysis, and can correct the situation of text tilting/shifting in a box by combining secondary identification. The training set uses a random text line input in a positive direction, has a fixed font, and meanwhile also includes data such as ambiguity and noise used by the training set of the model.

After the identification result is obtained according to the above steps, the present solution still needs to perform multi-dimensional verification of the identification result, including:

(1) In step 1, it can be seen that the identifier information is generated according to a certain rule, that is, a certain character of the identifier information can be verified by other characters, and due to the influence of 3D printing process, the identifier information may be filled or have defects caused by post-processing process, thus, the identification is affected. The present method performs self-verification on the identifier information aiming at this problem, and effectively solves the identification difficulty caused by incomplete or ambiguous identifier information. For example, a mathematical relationship exists between characters in the identifier information, and when one character therein is missing or unidentifiable, the missing or unidentifiable character may be obtained according to the mathematical relationship through other characters.

(2) In order to make the identification result more stable and accurate, the main direction of the framed picture is rotated twice (being parallel to the horizontal direction) for identification, and a result with the highest degree of confidence therein is selected as a final result. Since it is not known whether the rotated identifier information is placed upright or upside down, two times of identification is needed, to select the highest degree of accuracy.

In an embodiment, an acute angle corresponding to the acute-angle removal process is less than 180°, and an offset amount corresponding to the offset process is 0-2 mm.

In an embodiment, the identifier information is a field composed of numbers and letters with a specific size, thickness, and spacing and generated according to a rule, and the field comprises a number bit and a check bit, characters of the check bit have a mathematical relationship with characters of the number bit, such that a character in the number bit incapable of being identified is obtained by operating the characters of the check bit and other characters of the number bit.

In an embodiment, the identifier information is composed of characters capable of being printed by 3D printing process.

In an embodiment, the step of detecting a largest plane of the digital three-dimensional model comprises: traversing individual triangular patches of the digital three-dimensional model, and stacking triangular patches having the same normal vector or normal vectors in which a difference value therebetween is within a preset range; comparing an area of stacked planes or patches corresponding to different normal vectors and determining a patch or a stacked plane with a largest area as the largest plane.

In an embodiment, a distance h between an exposed part of the positioning block and an adjacent gum line is greater than or equal to a preset safe distance, wherein the adjacent gum line is a gum line segment corresponding to the exposed part of the positioning block, and the distance h is a smallest distance between the gum line segment and the positioning block.

In an embodiment, the step of acquiring the identifier information in the second tooth mold comprises: performing an image processing on a picture of the tooth mold; positioning a region where the identifier information is located based on a GPU and a priori knowledge, and framing out the region; and acquiring the identifier information based on an in-depth learning algorithm and a cross-validation method.

In an embodiment, the step of acquiring the identifier information based on an in-depth learning algorithm and a cross-validation method comprises: calculating a character probability at each pixel point in the region by using a character detection algorithm based on in-depth learning, so as to obtain a probability map; obtaining an approximate position of each character based on the probability map, and performing removing and filling based on the priori knowledge, wherein the priori knowledge comprises relevant hardware parameters and at least one of bit number, character set, font, orientation and positional relationship used by the identifier information; and determining a character position according to the approximate position of the character and a priori condition, so as to obtain the identifier information.

The beneficial effects of the present disclosure are as follows: in the embodiments of the present disclosure, after constructing the digital three-dimensional model of the patient's teeth, the pre-processing operation is performed on the digital three-dimensional model, wherein the pre-processing operation includes identifying the gum lines on the digital three-dimensional model and adding the identifier information to the digital three-dimensional model, and performing 3D printing based on the identifier information of the digital three-dimensional model, to obtain the first tooth mold. The film pressing process is performed according to the first tooth mold to obtain the second tooth mold. Finally, the identifier of the second tooth mold is identified, and the identifier information is marked to the second tooth mold according to the identification result so as to obtain the dental appliance. On the one hand, the present disclosure does not need to design the gum lines manually, which can avoid human errors, reduce the design error of the appliance, improve the yield of products, and improve the operation efficiency. On the other hand, the obtained dental appliance carries the identifier information capable of reflecting the diagnosis and treatment information about the user, and the personnel can identify the diagnosis and treatment information of the user through the identifier information on the dental appliance, thereby facilitating providing the user with follow-up services such as maintenance or diagnosis and treatment.

In some alternative embodiments, the functions/operations noted in the block diagrams may occur out of the order noted in the operational diagrams. For example, two blocks shown in succession may, in fact, be executed substantially concurrently or the blocks may sometimes be executed in the reverse order, depending upon the functions/operations involved. Furthermore, the embodiments presented and described in the flow charts of the present disclosure are provided by way of example for the purpose of providing a more thorough understanding of the technology. The disclosed method is not limited to the operations and logic flows presented herein. Optional embodiments are contemplated where the order of various operations is changed and sub-operations described as being part of a larger operation are performed independently.

In addition, while the present disclosure is described in the context of functional modules, it should be appreciated that one or more of the functions and/or features may be integrated in a single physical device and/or software module, or one or more functions and/or features may be implemented in separate physical devices or software modules, unless otherwise indicated. It will also be appreciated that detailed discussion of actual implementation of each module is not necessary to understand the present disclosure. Rather, considering the attributes, functions, and internal relationships of various functional modules in the device disclosed in the present disclosure, actual implementation of the modules will be understood within general techniques of the engineer. Therefore, those skilled in the art could implement the present disclosure as set forth in the claims without undue experimentation by applying ordinary techniques. It is also to be understood that the particular concept disclosed is illustrative only and is not intended to limit the scope of the present disclosure, and the scope of the present disclosure is determined by the full scope of the appended claims and their equivalents.

If the function is realized in a form of software functional unit and is sold or used as an individual product, it may be stored in one computer readable storage medium. Based on such understanding, the technical solution of the present disclosure essentially or the part making contribution to the prior art or part of this technical solution can be embodied in a form of software product, and this computer software product is stored in one storage medium, including several instructions used to make one computer device (which can be a personal computer, a sever or a network device etc.) execute all or some of the steps of the methods of various embodiments of the present disclosure. The aforementioned storage medium includes various media in which program codes can be stored, such as U disk, mobile hard disk, read-only memory (ROM), random access memory (RAM), diskette and compact disk.

The logic and/or steps represented in the flow charts or otherwise described herein, such as an ordered listing of executable instructions that can be considered to implement logical functions, can be embodied in any computer-readable medium for use by an instruction execution system, apparatus, or device (such as a computer-based system, processor-containing system, or other system that can fetch the instructions from the instruction execution system, apparatus, or device and execute the instructions) or in connection with the instruction execution system, apparatus, or device. For the purposes of the present description, a "computer-readable medium" can be any apparatus that can contain, store, communicate, propagate, or transport the program for use by or in connection with the instruction execution system, apparatus, or device.

More specific examples (a non-exhaustive list) of the computer readable medium include the following: an electrical connection part (electronic device) having one or more wires, a portable computer diskette (magnetic device), a random access memory (RAM), a read-only memory (ROM), an erasable programmable read-only memory (EPROM or flash memory), an optical fiber device, and a portable compact disc read-only memory (CDROM). Further, the computer readable medium could even be paper or other suitable medium upon which the program can be printed, as the program can be electronically obtained, for example, by optically scanning paper or other media, followed by editing, interpreting, or otherwise processing as necessary, and then stored in computer memory.

It should be understood that various parts of the present disclosure may be implemented by software, hardware, firmware, or a combination thereof. In the above embodiments, various steps or methods may be implemented by software or firmware stored in a memory and executed by a suitable instruction execution system. For example, if implemented by hardware, as in another embodiment, any one or combination of the following technologies well known in the art, may be used: discrete logic circuit having a logic gate circuit for implementing a logic function for a data signal, an application specific integrated circuit having an appropriate combinational logic gate circuit, a programmable gate array (PGA), a field programmable gate array (FPGA), or the like.

In the description of the present description, descriptions with reference to the terms such as "one embodiment", "some embodiments", "example", "specific example", or "some examples" indicates that specific features, structures, materials or characteristics described in combination with this embodiment or example are included in at least one embodiment or example of the present disclosure. In the present description, illustrative expression of the above terms does not necessarily refer to the same embodiment or example. Moreover, the specific features, structures, materials or characteristics described can be combined in any appropriate manner in any one or more embodiment or examples.

Although the embodiments of the present disclosure have been shown and described, those ordinarily skilled in the art could understand that these embodiments could be changed, modified, substituted, and varied without departing from the principle and spirit of the present disclosure, and the scope of the present disclosure is defined by the claims and equivalents thereof.

The preferred embodiments of the present disclosure are specifically described in the above, but the present disclosure is not limited to the described embodiments, and those skilled in the art could also make various equivalent modifications or substitutions without departing from the spirit of the present disclosure, and these equivalent modifications or substitutions are all included in the scope defined by the claims of the present disclosure.

What is claimed is:

1. A production method of dental instrument, comprising:
   constructing a digital three-dimensional model of a target patient's teeth;
   performing a pre-processing operation on the digital three-dimensional model, wherein the pre-processing operation comprises identifying gum lines on the digital three-dimensional model and adding an identifier information to the digital three-dimensional model;
   performing 3D printing according to the digital three-dimensional model, to obtain a first tooth mold, the first tooth mold carrying the identifier information;
   performing a film pressing process according to the first tooth mold to obtain a second tooth mold, the second tooth mold comprising the first tooth mold and a shell-shaped membrane cladding the first tooth mold;
   acquiring an image of the second tooth mold;
   matching a marking instruction corresponding to the identifier information from a database preset with a plurality of marking instructions after acquiring the identifier information in the second tooth mold; and
   performing a marking operation according to the marking instruction to obtain a dental appliance.

2. The production method of dental instrument according to claim 1, wherein performing a pre-processing operation on the digital three-dimensional model comprises:

automatically placing the digital three-dimensional model to a designated position;

identifying gum lines on the digital three-dimensional model;

performing acute-angle removal and offset processes on the identified gum lines to obtain a cutting curve, and converting the cutting curve into an NC file;

generating unique identifier information corresponding to the digital three-dimensional model; and placing the identifier information in a corresponding area of the digital three-dimensional model.

3. The production method of dental instrument according to claim 2, wherein an acute angle corresponding to the acute-angle removal process is less than 180°, and an offset amount corresponding to the offset process is 0-2 mm.

4. The production method of dental instrument according to claim 2, wherein the identifier information is a field composed of numbers and letters with a specific size, thickness, and spacing and generated according to a rule, and the field comprises a number bit and a check bit, characters of the check bit have a mathematical relationship with characters of the number bit, such that a character in the number bit incapable of being identified is obtained by operating the characters of the check bit and other characters of the number bit.

5. The production method of dental instrument according to claim 2, wherein the identifier information is composed of characters capable of being printed by 3D printing process.

6. The production method of dental instrument according to claim 2, wherein the automatically placing the digital three-dimensional model to a designated position comprises:

acquiring the digital three-dimensional model;

detecting a largest plane of the digital three-dimensional model;

calculating a first rotation angle and a first rotation axis of the digital three-dimensional model with a cross product operation;

spatially rotating the digital three-dimensional model according to the first rotation angle and the first rotation axis to acquire a tooth model;

projecting the tooth model into a tooth contour curve;

calculating a direction vector of the tooth model before and after the spatial rotating;

calculating, according to the direction vector, a second rotation angle and a second rotation axis of the digital three-dimensional model through the cross product operation; and performing plane rotation on the digital three-dimensional model according to the second rotation angle and the second rotation axis.

7. The production method of dental instrument according to claim 6, wherein the step of detecting a largest plane of the digital three-dimensional model comprises:

traversing individual triangular patches of the digital three-dimensional model, and stacking triangular patches having the same normal vector or normal vectors in which a difference value therebetween is within a preset range;

comparing an area of stacked planes or patches corresponding to different normal vectors and determining a patch or a stacked plane with a largest area as the largest plane.

8. The production method of dental instrument according to claim 2, wherein the identifying gum lines on the digital three-dimensional model comprises:

acquiring initial feature points of the digital three-dimensional model;

denoising the initial feature points to obtain optimal feature points;

determining a contour line by traversing historical data according to shape and contour of the digital three-dimensional model;

fitting the optimal feature points and the contour line to form an initial fitting line;

acquiring a contour shape of the digital three-dimensional model by adopting a principal component analysis method according to the initial fitting line; and acquiring a smooth gum line according to the contour shape.

9. The production method of dental instrument according to claim 1, wherein the performing a pre-processing operation on the digital three-dimensional model comprises at least one of:

segmenting the digital three-dimensional model to obtain several slice layers;

hollowing out the digital three-dimensional model;

performing a grid filling processing on a bottom plate of the digital three-dimensional model; and providing a positioning portion at a bottom of the digital three-dimensional model.

10. The production method of dental instrument according to claim 9, wherein a distance h between an exposed part of the positioning block and an adjacent gum line is greater than or equal to a preset safe distance, wherein the adjacent gum line is a gum line segment corresponding to the exposed part of the positioning block, and the distance h is a smallest distance between the gum line segment and the positioning block.

11. The production method of dental instrument according to claim 1, wherein acquiring the identifier information in the second tooth mold comprises:

acquiring picture information about the second tooth mold;

extracting a target picture of a region where the identifier information is located from the picture information about the second tooth mold; and identifying the identifier information in the target picture, and acquiring an optimal identification result according to a cross-validation method.

12. The production method of dental instrument according to claim 11, wherein the identifying the identifier information in the target picture, and acquiring an optimal identification result according to a cross-validation method comprises:

performing a normalization pre-processing on the identifier information;

performing character identification on the identifier information having undergone the normalization pre-processing, and acquiring a prediction result of character unit and a set of degree of confidence; and acquiring the optimal identification result by combining a character library and calibration bit according to the prediction result of character unit and the set of degree of confidence.

13. The production method of dental instrument according to claim 1, wherein the step of acquiring the identifier information in the second tooth mold comprises:

performing an image processing on a picture of the tooth mold;

positioning a region where the identifier information is located based on a GPU and a priori knowledge, and framing out the region; and acquiring the identifier information based on an in-depth learning algorithm and a cross-validation method.

14. The production method of dental instrument according to claim 13, wherein the step of acquiring the identifier information based on an in-depth learning algorithm and a cross-validation method comprises:
   calculating a character probability at each pixel point in the region by using a character detection algorithm based on in-depth learning, so as to obtain a probability map;
   obtaining an approximate position of each character based on the probability map, and performing removing and filling based on the priori knowledge, wherein the priori knowledge comprises relevant hardware parameters and at least one of bit number, character set, font, orientation and positional relationship used by the identifier information; and
   determining a character position according to the approximate position of the character and a priori condition, so as to obtain the identifier information.

15. The production method of dental instrument according to claim 1, wherein the database is further preset with a plurality of cutting instructions, the image identification module is further configured to, after acquiring the identifier information in the second tooth mold, match a cutting instruction corresponding to the identifier information from the database, and send the cutting instruction to the cutting machine; and
   the cutting machine is configured to perform a cutting operation according to the cutting instruction.

16. The production method of dental instrument according to claim 1, wherein the identifier information is in a form of at least one of hollowed-out characters, raised characters, and groove characters, and the identifier information is set as a combination of numbers and letters.

17. A production system of dental instrument, comprising a control center, a pre-processing module, a 3D molding module, a film pressing module, a laser marking module, and an acquisition terminal, wherein
   the pre-processing module is configured to construct a digital three-dimensional model of teeth of a target patient, and perform a pre-processing operation on the digital three-dimensional model, wherein the pre-processing operation comprises at least one of identifying gum lines on the digital three-dimensional model and adding identifier information to the digital three-dimensional model;
   the 3D molding module is configured to perform 3D printing according to the digital three-dimensional model to obtain a first tooth mold, wherein the first tooth mold carries the identifier information;
   the film pressing module is configured to perform a film pressing process according to the first tooth mold to obtain a second tooth mold, the second tooth mold comprises the first tooth mold and a shell-shaped membrane cladding the first tooth mold;
   the acquisition terminal is configured to acquire an image of the second tooth mold, the control center comprises a database preset with a plurality of marking instructions and an image identification module, wherein the image identification module is configured to, after acquiring the identifier information in the second tooth mold based on the image of the second tooth mold, match a marking instruction corresponding to the identifier information from the database preset with a plurality of marking instructions, and send the marking instruction to the laser marking module; and
   the laser marking module is configured to perform a marking operation according to the marking instruction to obtain a dental appliance.

18. The production system of dental instrument according to claim 17, wherein the production system further comprises a workbench, the workbench is configured to place the second tooth mold; the acquisition terminal is provided with an image acquisition element, a first photoelectric sensor, and a second photoelectric sensor, wherein a first end of the image acquisition element is connected to the first photoelectric sensor, and a second end of the image acquisition element is connected to the second photoelectric sensor, the image acquisition element is configured to acquire identifier information about the first tooth mold, the first photoelectric sensor is configured to detect a state of the second tooth mold, and the second photoelectric sensor is configured to detect a state of other articles in a workpiece placement area of the workbench except the second tooth mold.

19. The production system of dental instrument according to claim 17, wherein the production system further comprises a cutting machine, the database is further preset with a plurality of cutting instructions, the image identification module is further configured to, after acquiring the identifier information in the second tooth mold, match a cutting instruction corresponding to the identifier information from the database, and send the cutting instruction to the cutting machine; and the cutting machine is configured to perform a cutting operation according to the cutting instruction.

20. A computer device, comprising a memory and a processor, wherein the memory is configured to store at least one program, and the processor is configured to load the at least one program so as to execute the production method of dental instrument, comprising:
   constructing a digital three-dimensional model of a target patient's teeth;
   performing a pre-processing operation on the digital three-dimensional model, wherein the pre-processing operation comprises identifying gum lines on the digital three-dimensional model and adding an identifier information to the digital three-dimensional model;
   performing 3D printing according to the digital three-dimensional model, to obtain a first tooth mold, the first tooth mold carrying the identifier information;
   performing a film pressing process according to the first tooth mold to clad a shell-shaped membrane on the first tooth mold, so as to obtain a second tooth mold, the second tooth mold comprising the first tooth mold and a shell-shaped membrane cladding the first tooth mold;
   acquiring an image of the second tooth mold;
   matching a marking instruction corresponding to the identifier information from a database preset with a plurality of marking instructions after acquiring the identifier information in the second tooth mold; and
   performing a marking operation according to the marking instruction to obtain a dental appliance.

* * * * *